US009793838B1

(12) United States Patent
Wang

(10) Patent No.: US 9,793,838 B1
(45) Date of Patent: Oct. 17, 2017

(54) AUTO PHASE ADJUSTMENT SYSTEM AND METHOD FOR MOTOR CONTROL

(71) Applicant: Marvell International Ltd., Hamilton (BM)

(72) Inventor: Yichao Wang, Singapore (SG)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 15/094,933

(22) Filed: Apr. 8, 2016

Related U.S. Application Data

(60) Provisional application No. 62/166,366, filed on May 26, 2015.

(51) Int. Cl.
    *H02P 6/16* (2016.01)
    *H02P 6/15* (2016.01)
    *H02P 6/17* (2016.01)
    *H02P 6/08* (2016.01)

(52) U.S. Cl.
    CPC ............ *H02P 6/157* (2016.02); *H02P 6/08* (2013.01); *H02P 6/17* (2016.02)

(58) Field of Classification Search
    CPC .......................................... H02P 6/06
    USPC ................. 318/400.07, 400.04, 400.01, 700
    See application file for complete search history.

(56) References Cited

U.S. PATENT DOCUMENTS

| 4,275,343 | A  | * | 6/1981  | Fulton ............... H02P 25/024 318/721 |
| 9,088,231 | B2 | * | 7/2015  | Schulz ............... H02P 6/08 |
| 9,197,125 | B2 | * | 11/2015 | Bachmaier .......... H02M 7/125 |

* cited by examiner

*Primary Examiner* — David S Luo

(57) ABSTRACT

A method includes measuring a speed of a motor, determining a phase angle of a motor voltage relative to a motor current based on the measured speed of the motor, adjusting a profile of the motor voltage by the determined phase angle, and generating a profile of a drive voltage based on the adjusted profile of the motor voltage and a back-EMF profile. An apparatus includes a motor, and a driver circuit. The driver circuit measures a speed of the motor, determines a phase angle of a motor voltage relative to a motor current based on the measured speed of the motor, adjusts a profile of the motor voltage by the determined phase angle, and generates a profile of a drive voltage based on the adjusted profile of the motor voltage and a back-EMF profile.

18 Claims, 6 Drawing Sheets

1-100

2-120

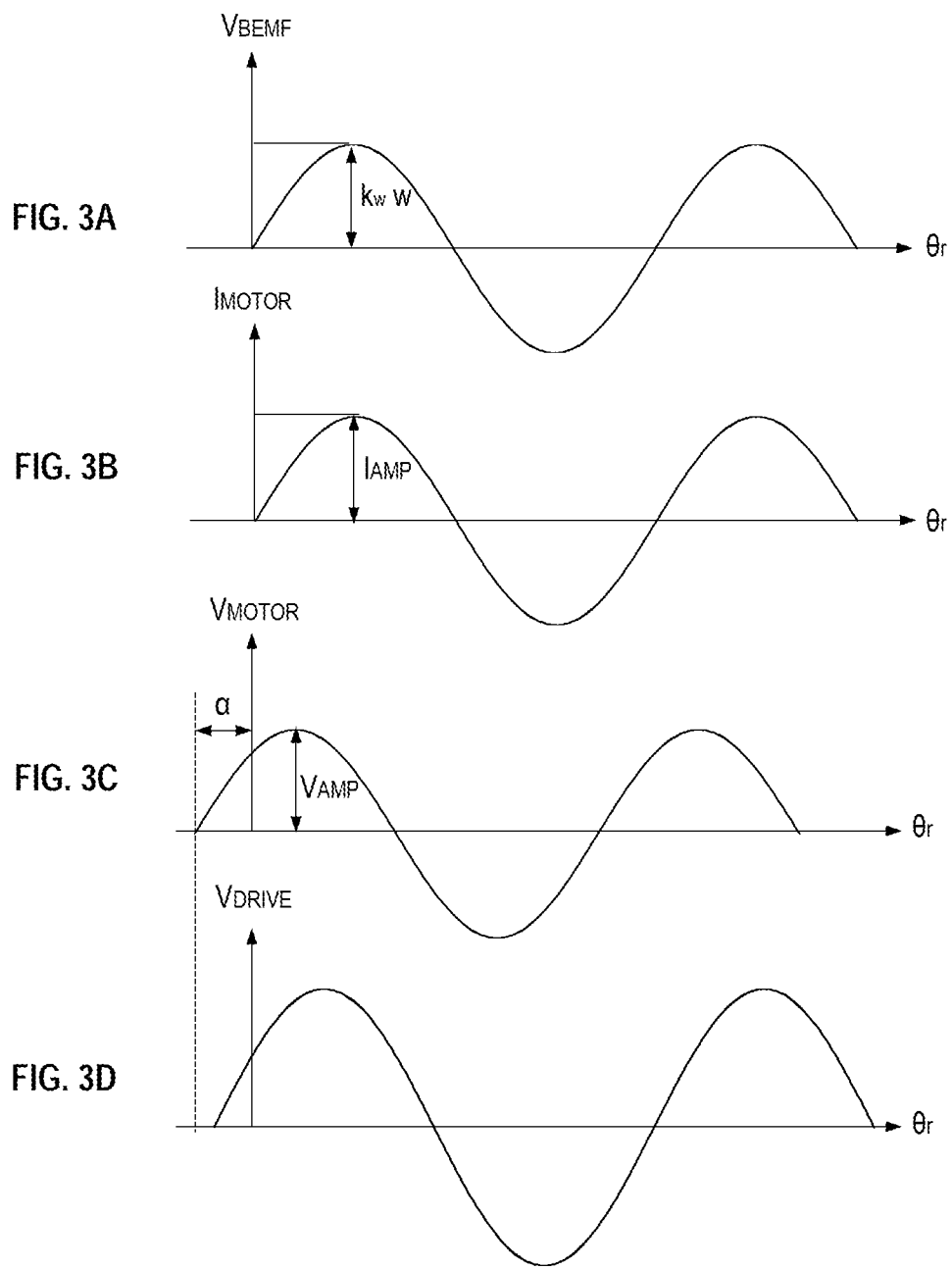

AUTO PHASE ADJUSTMENT SYSTEM AND METHOD FOR MOTOR CONTROL

CROSS REFERENCE TO RELATED APPLICATION

This present disclosure claims the benefit of U.S. Provisional Application No. 62/166,366, filed on May 26, 2015, which is incorporated by reference herein in its entirety.

BACKGROUND

A brushless motor system includes a multi-phase electric motor (hereinafter, referred to as "the motor") and a motor driver circuit. The motor driver circuit generates one or more alternating current (AC) signals to provide drive voltage signals to the motor, according to a position of a rotor of the motor with respect to one or more of a plurality of coils of the motor. Each of the coils of the motor includes an inductor component that leads to a phase lag between a drive voltage and a current flowing through the motor. The motor driver circuit is desirable to adjust the phase lag in order to increase output efficiency of the motor.

SUMMARY

In an embodiment, a method includes measuring a speed of a motor, determining a phase angle of a motor voltage relative to a motor current based on the measured speed of the motor, adjusting a profile of the motor voltage by the determined phase angle, and generating a profile of a drive voltage based on the adjusted profile of the motor voltage and a back-EMF profile.

In an embodiment, an apparatus includes a motor, and a driver circuit to measure a speed of the motor, determine a phase angle of a motor voltage relative to a motor current based on the measured speed of the motor, adjust a profile of the motor voltage by the determined phase angle, and generate a profile of a drive voltage based on the adjusted profile of the motor voltage and a back-EMF profile.

BRIEF DESCRIPTION OF THE DRAWINGS

FIG. 3A illustrates a profile of a back-EMF voltage according to an embodiment.

FIG. 3B illustrates a profile of a motor current according to an embodiment.

FIG. 3C illustrates a profile of a motor voltage according to an embodiment.

FIG. 3D illustrates a profile of a drive voltage according to an embodiment.

DETAILED DESCRIPTION

Figure 1:
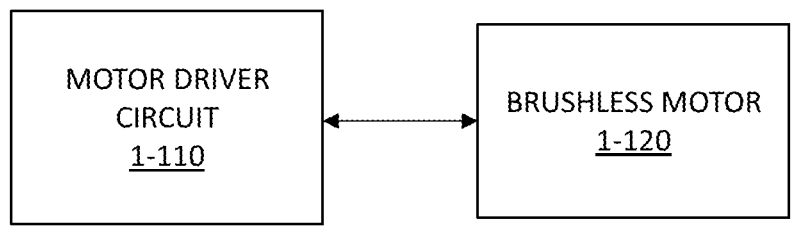
FIG. 1 is a block diagram of a brushless motor system according to an embodiment.

FIG. 1 shows a brushless motor system 100 according to an embodiment. The brushless motor system 100 includes a motor driver circuit 1-110 and a brushless motor 1-120. The motor driver circuit 1-110 includes various devices and components used to drive (e.g., electrically commutate) the motor 1-120. In an embodiment, the motor driver circuit 1-110 includes one or more of commutation logic components, external power field-effect transistors (FETs), temperature monitoring components, start-up components, and so on. In an embodiment, the motor driver circuit 1-110 includes a microprocessor executing computer programming instructions from a non-transitory computer-readable medium.

In an embodiment, the brushless motor system 100 is a three-phase brushless motor system, and the motor 1-120 is a three-phase brushless motor. In another embodiment, the brushless motor system 100 is a two-phase brushless motor system, and the motor 1-120 is a two-phase brushless motor. However, embodiments of the present disclosure are not limited to the two- or three-phase brushless motor systems.

Figure 2A:
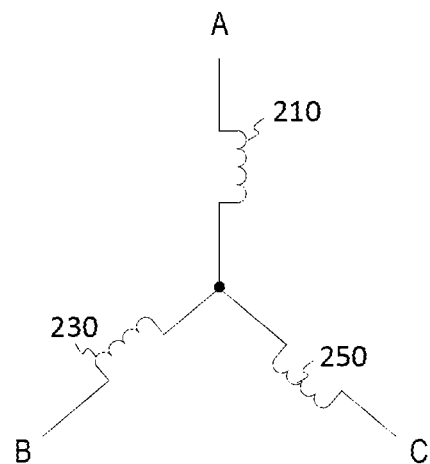
FIG. 2A is a schematic diagram of a three-phase brushless motor according to an embodiment.

FIG. 2A is a schematic diagram of a three-phase brushless motor 2-120 suitable for use as the brushless motor 1-120 of FIG. 1. The motor 2-120 includes first, second, and third coils 210, 230, and 250.

First ends of the first, second, and third coils 210, 230, and 250 are connected to first, second, and third terminals A, B, and C, respectively. Second ends of the first, second, and third coils 210, 230, and 250 are connected to each other.

Although the first, second, and third coils 210, 230, and 250 are connected in a wye configuration as shown in FIG. 2A, embodiments of the present disclosure are not limited thereto. In another embodiment, the first, second, and third coils 210, 230, and 250 are connected in a delta configuration.

A motor driver circuit (e.g., the motor driver circuit 1-110 of FIG. 1) provides first, second, and third phase signals in order to control currents flowing through the first, second, and third coils 210, 230, and 250, respectively. In an embodiment, the motor 2-120 operates in sinusoidal commutation with the motor driver circuit such that the motor driver circuit provides substantially sinusoidal first, second, and third phase voltages to the first, second, and third terminals A, B, and C, respectively. A person of ordinary skill in light of the teachings and disclosures herein would understand how to implement such a motor driver circuit, for example, using a pulse width modulation (PWM) motor control.

Figure 2B:
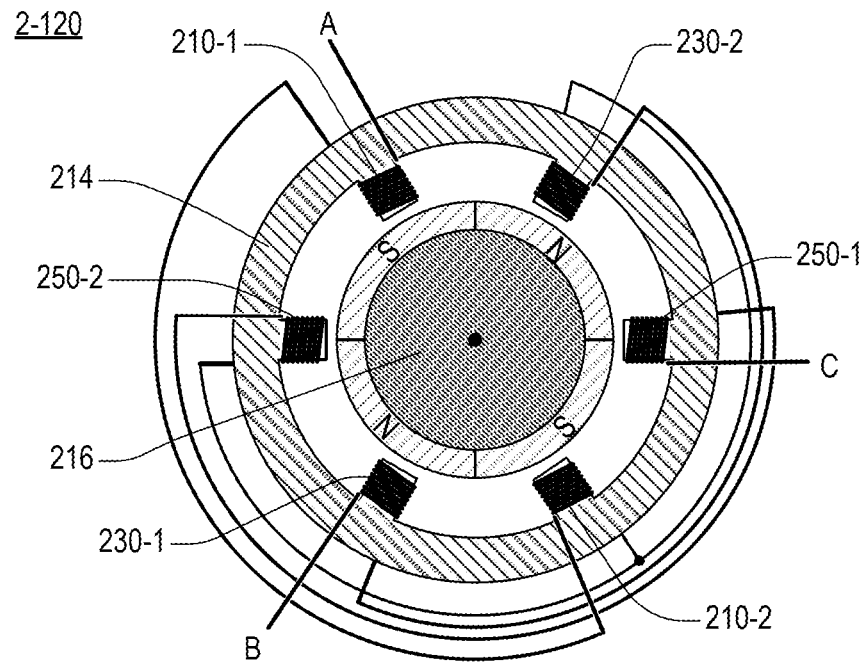
FIG. 2B illustrates a cross-sectional diagram of the three-phase brushless motor of FIG. 2A according to an embodiment.

FIG. 2B is a simplified cross-sectional diagram that illustrates the motor 2-120 of FIG. 2A according to an embodiment.

The motor 2-120 includes a stator 214. Wound on the stator 214 are first and fourth coil parts 210-1 and 210-2 which are connected in series to form the first coil 210, second and fifth coil parts 230-1 and 230-2 which are connected in series to form the second coil 230, and third and sixth coil parts 250-1 and 250-2 which are connected in series to form the third coil 250. The motor 2-120 further includes a rotor 216 having one or more magnets, each magnet including a north pole and a south pole.

Figure 2C:
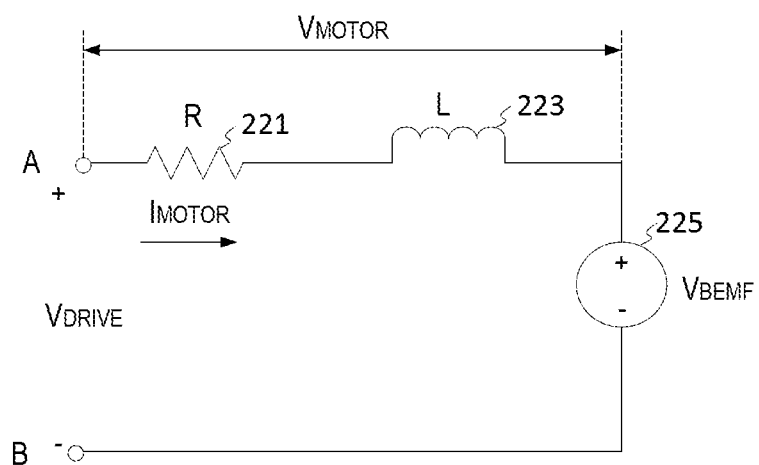
FIG. 2C is a per-phase circuit diagram of the three-phase brushless motor of FIG. 2A according to an embodiment.

FIG. 2C is a per-phase circuit diagram of the motor 2-120 of FIG. 2A according to an embodiment. In the motor 2-120, a drive voltage $V_{DRIVE}$ is applied to a pair of the first, second, and third terminals A, B, and C. FIG. 2C illustrates an equivalent model of the motor 2-120 when first and second phase voltages are applied to the first and second terminals A and B of the motor 2-120, such that the drive voltage $V_{DRIVE}$ is applied between the first and second terminals A and B of the motor 2-120. In an embodiment, each of the first and second phase voltages has a substantially sinusoidal profile to provide the drive voltage $V_{DRIVE}$ that is a substantially sinusoidal drive voltage.

In another embodiment, at least one of the first and second phase voltages applied to the first and second terminals A and B may not have a truly sinusoidal profile, so long as a difference between values of the first and second phase voltages result in a substantially sinusoidal profile corresponding to the substantially sinusoidal drive voltage $V_{DRIVE}$.

The per-phase circuit diagram of FIG. 2C shows a resistor 221, an inductor 223, and a voltage source 225 that are connected in series. The resistor 221 and the inductor 223 indicate a resistor component and an inductor component, respectively, along a path between the first and second terminals A and B of the motor 2-120. Hereinafter, a voltage across the resistor 221 and the inductor 223 is referred to as a motor voltage $V_{MOTOR}$.

When the drive voltage $V_{DRIVE}$ is applied to the first and second terminals A and B of the motor 2-120, a motor current $I_{MOTOR}$ flows through the resistor 221 and the inductor 223. Thus, the drive voltage $V_{DRIVE}$ across the first and second terminals A and B is expressed as follows:

$$V_{DRIVE} = V_{MOTOR} + V_{BEMF}$$ Equation 1.

FIG. 3A shows a profile of the back-EMF voltage $V_{BEMF}$ of FIG. 2C at an angular speed (or velocity) w according to an embodiment. In this embodiment, the profile of the back-EMF voltage $V_{BEMF}$ is substantially sinusoidal, and is expressed as follows:

$$V_{BEMF} = k_w w V(\theta_r) = k_w w \sin \theta_r$$ Equation 2.

In Equation 2, $k_w$ denotes a back-EMF constant, w denotes an angular speed (or velocity) of a rotor of a brushless motor (e.g., the motor 2-120 of FIG. 2A), $V(\theta_r)$ denotes a reference back-EMF profile, and $\theta_r$ denotes an angular position of the rotor. In an embodiment, the rotor speed w is measured using a Hall effect device that detects a position of the rotor. In another embodiment, the rotor speed w is measured using a back-EMF detector circuit that detects one or more back-EMF profiles.

In an embodiment, the reference back-EMF profile $V(\theta_r)$ is obtained using a prototype motor, and the obtained reference back-EMF profile $V(\theta_r)$ is stored in a storage device (not shown). An amplitude of the profile of the back-EMF voltage $V_{BEMF}$ is equal to a value determined by multiplying the back-EMF constant $k_w$ and the measured rotor speed w, as shown in Equation 2. Thus, the reference back-EMF profile $V(\theta_r)$ can be scaled by the determined value to generate the profile of the back-EMF voltage $V_{BEMF}$ at the rotor speed w.

FIG. 3B shows a profile of the motor current $I_{MOTOR}$ of FIG. 2C according to an embodiment. In order to increase output efficiency of the motor 2-120, a motor driver circuit (e.g., the motor driver circuit 1-110 of FIG. 1) controls the motor 2-120 such that the profile of the motor current $I_{MOTOR}$ is aligned with the profile of the back EMF voltage $V_{BEMF}$ of FIG. 3A.

As a result, the profile of the motor current $I_{MOTOR}$ is substantially sinusoidal, and is expressed as follows:

$$I_{MOTOR}(\theta_r) = I_{AMP} \sin \theta_r$$ Equation 3.

In Equation 3, $I_{AMP}$ denotes an amplitude of the motor current $I_{MOTOR}$.

FIG. 3C shows a profile of the motor voltage $V_{MOTOR}$ of FIG. 2C according to an embodiment. In this embodiment, the profile of the motor voltage $V_{MOTOR}$ is substantially sinusoidal, and is expressed as follows:

$$V_{MOTOR}(\theta_r) = V_{AMP} \sin(\theta_r + \alpha)$$ Equation 4.

In Equation 4, $V_{AMP}$ denotes an amplitude of the motor voltage $V_{MOTOR}$, and $\alpha$ denotes a phase angle of the motor voltage $V_{MOTOR}$ relative to the motor current $I_{MOTOR}$.

The amplitude $V_{AMP}$ of the motor voltage $V_{MOTOR}$ can be adjusted based on a comparison result between the measured rotor speed w and a target speed. In an embodiment, when the measured rotor speed w is higher than the target speed, the motor driver circuit decreases the amplitude $V_{AMP}$ of the motor voltage $V_{MOTOR}$ to decrease the rotor speed w. On the other hand, when the measured rotor speed w is lower than the target speed, the motor driver circuit increases the amplitude $V_{AMP}$ of the motor voltage $V_{MOTOR}$ to increase the rotor speed w. In an embodiment, the measured rotor speed w is determined as being substantially equal to the target speed when a difference between the measured rotor speed w and the target speed is less than 5%, 3%, or 1% of the target speed.

Regarding the phase angle $\alpha$, because the resistor 221 and the inductor 223 of FIG. 2C are connected in series, the motor current $I_{MOTOR}$ lags the motor voltage $V_{MOTOR}$ by the following phase angle $\alpha$:

$$\alpha = \tan^{-1}\left(\frac{wL}{R}\right).$$ Equation 5

In Equation 5, L denotes an inductance value of the inductor 223, and R denotes a resistance value of the resistor 221. As a result, as can be seen from FIGS. 3A to 3C, the profile of the motor voltage $V_{MOTOR}$ advances the profile of the motor current $I_{MOTOR}$ by the phase angle $\alpha$ in order to align the motor current $I_{MOTOR}$ with the back-EMF voltage $V_{BEMF}$.

FIG. 3D shows a profile of the drive voltage $V_{DRIVE}$ of FIG. 2C according to an embodiment. According to Equation 1, the drive voltage $V_{DRIVE}$ is a sum of the motor voltage $V_{MOTOR}$ and the back-EMF voltage $V_{BEMF}$. Thus, the profile of the drive voltage $V_{DRIVE}$ is generated by summing the profile of the motor voltage $V_{MOTOR}$ of FIG. 3C and the profile of the back-EMF voltage $V_{BEMF}$ of FIG. 3A.

Although FIGS. 3A-3D illustrate an operation of the motor 2-120 in the sinusoidal commutation with a motor driver circuit, embodiments of the present disclosure are not limited thereto. In another embodiment, the motor 2-120 operates in trapezoidal commutation with another motor driver circuit that provides trapezoidal drive profiles to the motor 2-120.

As described above, a motor driver circuit according to an embodiment of the present disclosure determines a phase lag of a motor current $I_{MOTOR}$ relative to a motor voltage $V_{MOTOR}$ based on a measured speed of a motor, and adjusts a profile of the motor voltage $V_{MOTOR}$ based on the determined phase lag. Subsequently, the motor driver circuit generates a profile of a drive voltage $V_{DRIVE}$ based on the adjusted profile of the motor voltage $V_{MOTOR}$. Because the profile of the motor current $I_{MOTOR}$ is adaptively aligned with the profile of a back-EMF voltage $V_{BEMF}$ according to the measured speed, a process of adjusting a phase lag according to an embodiment of the present disclosure increases output efficiency of the motor compared to a conventional phase lag adjustment process that is based on a plurality of values of a phase lag.

In the conventional phase lag adjustment process, the plurality of values of the phase lag are obtained by a manual tuning process. Thus, a process of adjusting a phase lag according to an embodiment is simpler and more reliable than the manual tuning process of the conventional motor system.

Figure 4A:
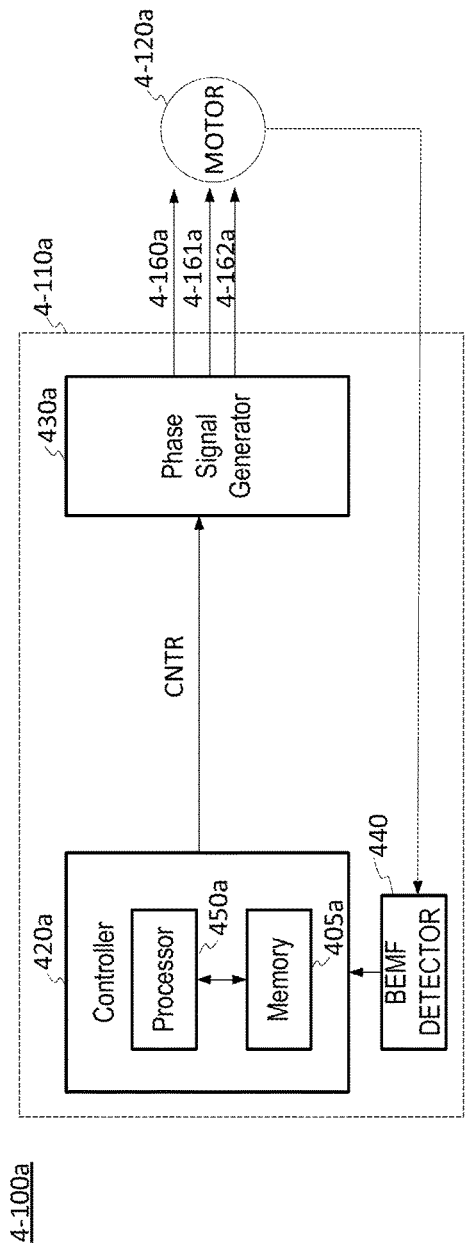
FIG. 4A is a block diagram of a brushless motor system according to an embodiment.

FIG. 4A is a block diagram of a brushless motor system 4-100a according to an embodiment. The brushless motor system 4-100a includes a motor driver circuit 4-110a and a motor 4-120a. The motor driver circuit 4-110a includes a controller 420a, a phase signal generator 430a, and a back-EMF detector 440.

In an embodiment, the motor system 4-100a is a three-phase brushless motor system, and the motor 4-120a is a three-phase brushless motor. In this embodiment, the phase signal generator 430a receives one or more control signals CNTR from the controller 420a, and provides first, second, and third phase signals 4-160a, 4-161a, and 4-162a to first, second, and third terminals of the motor 4-120a, respectively.

In an embodiment, the first, second, and the third phase signals 4-160a, 4-161a, and 4-162a have a substantially sinusoidal profile to operate the motor 4-120a in sinusoidal commutation. In another embodiment, the first, second, and the third phase signals 4-160a, 4-161a, and 4-162a have a substantially trapezoidal profile to operate the motor 4-120a in trapezoidal commutation.

The back-EMF detector 440 detects one or more back-EMF profiles across pairs of the first to third terminals of the motor 4-120a. The back-EMF detector 440 transmits the detected back-EMF profiles to the controller 420a, and the controller 420a measures a speed of a rotor in the motor 4-120a using the back-EMF profiles.

The controller 420a includes a processor 450a and a memory 405a. In an embodiment, the processor 450a of the controller 420a measures the speed of the rotor in the motor 4-120a using the back-EMF profiles. In an embodiment, a zero-crossing detector circuit detects a plurality of zero-crossings of the back-EMF profiles to measure a frequency of a back-EMF profile, and then the measured frequency is converted to the speed of the rotor in the motor 4-120a.

The memory 405a of the controller 420a stores a reference back-EMF profile. The processor 450a of the controller 420a scales the stored reference back-EMF profile based on the measured speed of the rotor.

The processor 450a further determines a phase angle of a motor voltage relative to a motor current based on the measured speed of the rotor, an inductance value of the motor 4-120a, and a resistance value of the motor 4-120a. In addition, the processor 450a adjusts an amplitude of the motor voltage based on the measured speed and a target speed of the motor 4-120a. As a result, the processor 450a generates a profile of the motor voltage, which advances the profile of the motor current by the determined phase angle and has the adjusted amplitude.

Subsequently, the processor 450a sums the profile of the motor voltage and the scaled back-EMF profile to generate a profile of a drive voltage. The generated profile of the drive voltage causes the profile of the motor current to be aligned with the scaled back-EMF profile.

In an embodiment, one or more of a back-EMF constant, the inductance value of the motor 4-120a, and the resistance value of the motor 4-120a are stored in the memory 405a.

The controller 420a generates the control signals CNTR based on the profile of the drive voltage and transmits the control signals CNTR to the phase signal generator 430a. The phase signal generator 430a generates the first to third phase signals 4-160a, 4-161a, and 4-162a based on the control signals CNTR and provides the first to third phase signals 4-160a, 4-161a, and 4-162a to the first, second, and third terminals of the motor 4-120a, respectively, so that a voltage between a pair of the terminals of the motor 4-120a corresponds to the generated profile of the drive voltage.

Figure 4B:
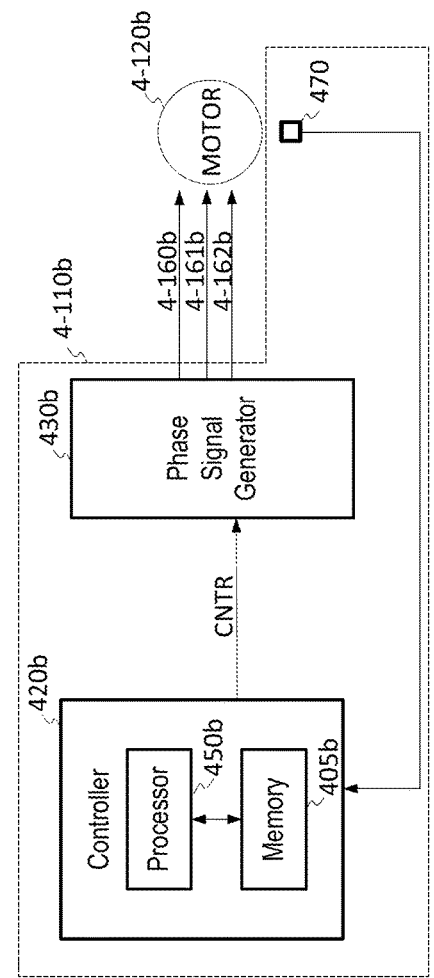
FIG. 4B is a block diagram of a brushless motor system according to another embodiment.

FIG. 4B is a block diagram of a brushless motor system 4-100b according to another embodiment. Like reference numerals in FIGS. 4A and 4B refer to like components, and descriptions thereof are omitted herein in the interest of brevity.

FIG. 4B differs from FIG. 4A in that, in FIG. 4B, an angular speed of a rotor of a motor 4-120b is measured using a Hall effect device 470 that detects a position of the rotor, rather than using the back-EMF detect circuit 440 of FIG. 4A. In an embodiment, the Hall effect device 470 includes three Hall effect sensors that are separated from each other by a predetermined angle (e.g., 60° or 120°) and mounted on a surface of a stator in the motor 4-120b.

The Hall effect device 470 transmits output signals indicative of the position of the rotor to a controller 420b. In an embodiment, the controller 420b includes a processor 450b that measures the speed of the rotor in the motor 4-120b using the output signals from the Hall effect device 470.

Figure 5:
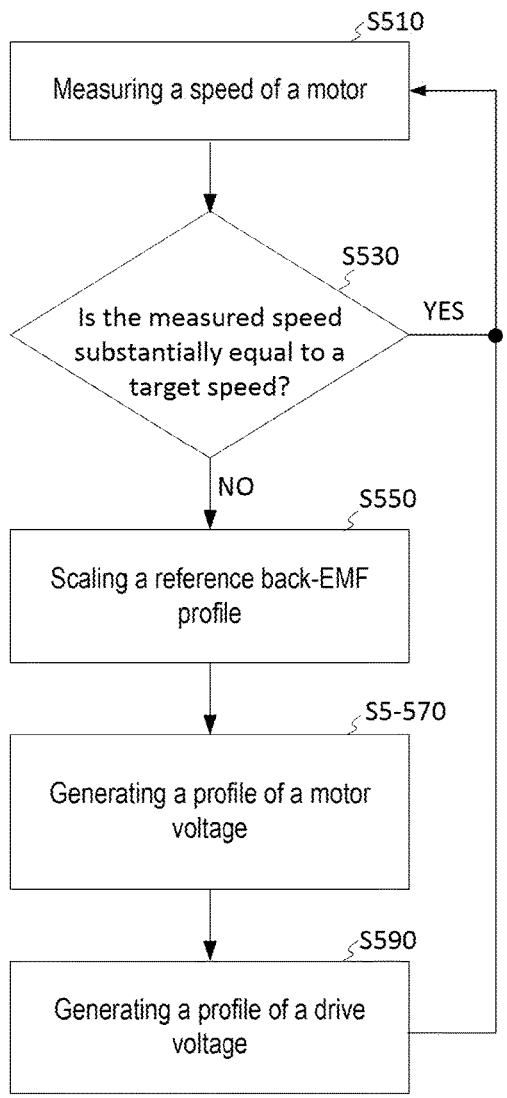
FIG. 5 is a flowchart that illustrates a process performed by a motor driver circuit according to an embodiment.

FIG. 5 is a flowchart that illustrates a process 500 performed by a motor driver circuit according to an embodiment. In this embodiment, the motor driver circuit provides one or more sinusoidal drive signals to a motor.

At S510, the motor driver circuit measures a speed of the motor. For example, the speed of the motor corresponds to a speed of a rotor included in the motor. In an embodiment, the motor driver circuit includes a back-EMF detector that detects one or more back-EMF profiles across pairs of terminals of the motor, and the detected back-EMF profiles are used to measure the speed of the motor. In another embodiment, the motor driver circuit includes a Hall effect device to measure the speed of the motor.

At S530, the motor driver circuit determines whether the measured speed of the motor is substantially equal to a target speed of the motor. In an embodiment, a processor included in the motor driver circuit performs S530. When the measured speed is substantially equal to the target speed, the process 500 goes back to S510. On the other hand, when the measured speed is not substantially equal to the target speed, the process 500 proceeds to S550.

At S550, the motor driver circuit scales a reference back-EMF profile based on the measured speed of the motor. In an embodiment, the reference back-EMF profile is stored in a memory included in the motor driver circuit, and the processor of the motor driver circuit scales the reference back-EMF profile based on the measured speed of the motor.

At S5-570, the motor driver circuit generates a profile of a motor voltage. In an embodiment, the processor of the motor driver circuit generates the profile of the motor voltage, and this process will be described in more detail with reference to FIG. 6.

At S590, the motor driver circuit sums the profile of the motor voltage and the scaled back-EMF profile to generate a profile of a drive voltage. In an embodiment, the processor of the motor driver circuit sums the profile of the motor voltage and the scaled back-EMF profile. The generated profile of the drive voltage causes a profile of a motor current to be aligned with the scaled back-EMF profile, thereby increasing output efficiency of the motor.

Figure 6:
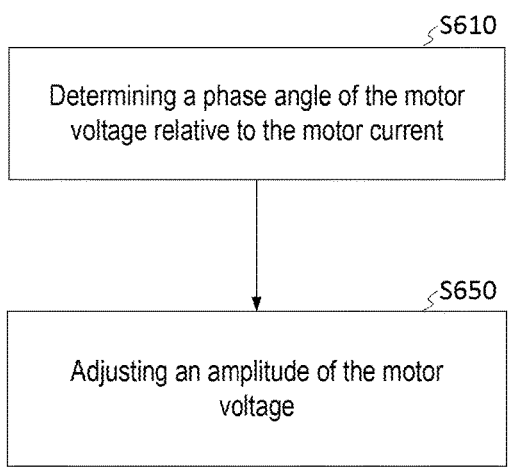
FIG. 6 is a flowchart that illustrates a process of generating a profile of a motor voltage according to an embodiment.

FIG. 6 is a flowchart that illustrates a process 6-570 of generating a profile of a motor voltage according to an embodiment. The process 6-570 may be used at S5-570 of the process 500 shown in FIG. 5.

At S610, a motor driver circuit determines a phase angle of the motor voltage relative to a motor current. In an embodiment, a processor of the motor driver circuit determines the phase angle based on a measured speed of a motor, an inductancevalue of the motor, and a resistance value of the motor.

At S650, the motor driver circuit adjusts an amplitude of the motor voltage. In an embodiment, when the processor of the motor driver circuit determines that the measured speed of the motor is higher than the target speed at S530 of FIG. 5, the processor decreases the amplitude of the motor voltage to decrease the speed of the motor. In this embodiment, when the processor of the motor driver circuit determines that the measured speed of the motor is smaller than the target speed, the processor increases the amplitude of the motor voltage to increase the speed of the motor. As a result, the motor driver circuit generates the profile of the motor voltage, which advances the profile of the motor current by the determined phase angle at S610 and has the adjusted amplitude at S650.

Figure 7:
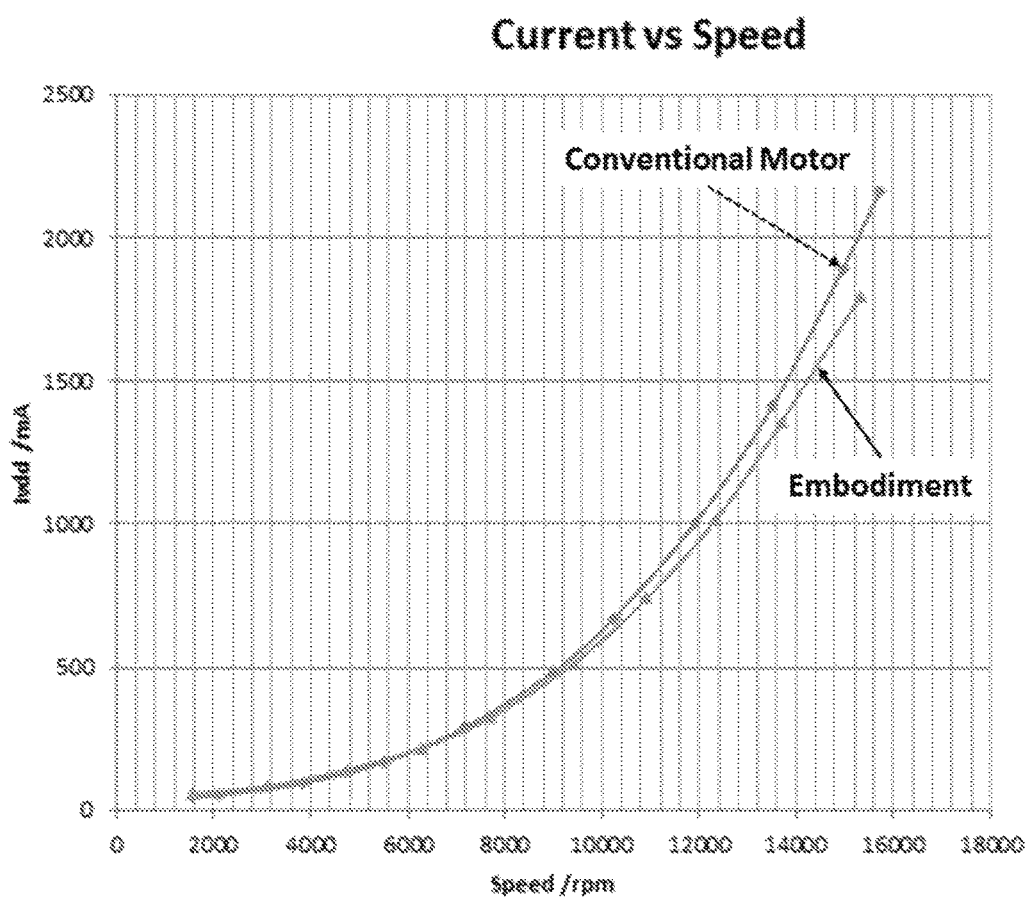
FIG. 7 illustrates comparison results between a conventional motor and a motor according to an embodiment.

FIG. 7 illustrates comparison results between a conventional motor and a motor according to an embodiment.

A phase lag of the conventional motor is adjusted based on one or more fixed values of the phase lag. As shown in FIG. 7, in order to achieve the same motor speed, the conventional motor uses a higher current than the motor according to the embodiment. That is, the comparison results of FIG. 7 show that the motor according to the embodiment has output efficiency higher than that of the conventional motor.

In addition, the phase lag of the conventional motor is typically adjusted using a manual tuning process. For example, the entire speed range of the conventional motor is divided into one or more speed ranges, and then each of the one or more fixed values of the phase lag is obtained for a corresponding one of the divided speed ranges. Because the one or more fixed values of the phase lag are discontinuous, a transition between adjacent speed ranges in the conventional motor leads to detrimental effects (e.g., speed hunting) during an operation of the conventional motor. In contrast, a process of adjusting a phase lag according to an embodiment may address the detrimental effects of the conventional motor.

Further aspects of the present disclosure relate to one or more of the following clauses.

In an embodiment, a method includes measuring a speed of a motor, determining a phase angle of a motor voltage relative to a motor current based on the measured speed of the motor, adjusting a profile of the motor voltage by the determined phase angle, and generating a profile of a drive voltage based on the adjusted profile of the motor voltage and a back-EMF profile.

In an embodiment, a profile of the motor current is substantially aligned with the back-EMF profile of the motor.

In an embodiment, the phase angle α of the motor voltage satisfies the following equation:

$$\alpha = \tan^{-1}\left(\frac{wL}{R}\right),$$

where w is an angular velocity of a rotor of the motor, L is an inductance value of an inductor component of the motor, and R is a resistance value of a resistor component of the motor.

In an embodiment, the method further includes detecting a position of a rotor of the motor using one or more Hall effect sensors. The speed of the motor is measured based on the detected position of the rotor.

In an embodiment, the method further includes detecting one or more back-EMF profiles of the motor using a back-EMF detector. The speed of the motor is measured based on the detected one or more back-EMF profiles.

In an embodiment, the method further includes storing a reference back-EMF profile in a storage device.

In an embodiment, the method further includes scaling the stored reference back-EMF profile based on the speed of the motor to generate the back-EMF profile.

In an embodiment, generating the profile of the drive voltage includes summing the back-EMF profile and the adjusted profile of the motor voltage.

In an embodiment, the method further includes determining whether the speed of the motor is substantially equal to a target speed of the motor.

In an embodiment, the method further includes increasing an amplitude of the drive voltage when the speed of the motor is lower than the target speed of the motor and decreasing the amplitude of the drive voltage when the speed of the motor is higher than the target speed of the motor.

In an embodiment, an apparatus includes a motor, and a driver circuit to measure a speed of the motor, determine a phase angle of a motor voltage relative to a motor current based on the measured speed of the motor, adjust a profile of the motor voltage by the determined phase angle, and generate a profile of a drive voltage based on the adjusted profile of the motor voltage and a back-EMF profile.

In an embodiment, a profile of the motor current is substantially aligned with the back-EMF profile of the motor.

In an embodiment, the driver circuit includes a controller to determine the phase angle of the motor voltage, the phase angle satisfying the following equation:

$$\alpha = \tan^{-1}\left(\frac{wL}{R}\right),$$

where α is the phase angle, w is an angular velocity of a rotor of the motor, L is an inductance value of an inductor component of the motor, and R is a resistance value of a resistor component of the motor.

In an embodiment, the driver circuit includes one or more Hall effect sensors to detect a position of a rotor of the motor and a controller to measure the speed of the motor based on the detected position of the rotor.

In an embodiment, the driver circuit includes a back-EMF detector to detect one or more back-EMF profiles of the motor and a controller to measure the speed of the motor based on the detected back-EMF profiles.

In an embodiment, the driver circuit includes a storage device to store a reference back-EMF profile.

In an embodiment, the driver circuit further includes a controller to scale the reference back-EMF profile based on the speed of the motor to generate the back-EMF profile.

In an embodiment, the driver circuit includes a controller. The controller sums the back-EMF profile and the adjusted profile of the motor voltage to generate the profile of the drive voltage.

In an embodiment, the driver circuit includes a controller. The controller determines whether the speed of the motor is substantially equal to a target speed of the motor.

In an embodiment, the controller increases an amplitude of the drive voltage when the speed of the motor is lower than the target speed of the motor, and the controller decreases the amplitude of the drive voltage when the speed of the motor is higher than the target speed of the motor.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. A method comprising:
   measuring a speed of a motor;
   determining a phase angle of a motor voltage relative to a motor current based on the measured speed of the motor;
   adjusting a profile of the motor voltage by the determined phase angle; and
   generating a profile of a drive voltage based on the adjusted profile of the motor voltage and a back-EMF profile,
   wherein a profile of the motor current is substantially aligned with the back-EMF profile of the motor.

2. The method of claim 1, wherein the phase angle α of the motor voltage satisfies the following equation:

$$\alpha = \tan^{-1}\left(\frac{wL}{R}\right),$$

where w is an angular velocity of a rotor of the motor, L is an inductance value of an inductor component of the motor, and R is a resistance value of a resistor component of the motor.

3. The method of claim 1, further comprising:
   detecting a position of a rotor of the motor using one or more Hall effect sensors,
   wherein the speed of the motor is measured based on the detected position of the rotor.

4. The method of claim 1, further comprising:
   detecting one or more back-EMF profiles of the motor using a back-EMF detector,
   wherein the speed of the motor is measured based on the detected one or more back-EMF profiles.

5. The method of claim 1, further comprising:
   storing a reference back-EMF profile in a storage device.

6. The method of claim 5, further comprising:
   scaling the stored reference back-EMF profile based on the speed of the motor to generate the back-EMF profile.

7. The method of claim 1, wherein generating the profile of the drive voltage includes summing the back-EMF profile and the adjusted profile of the motor voltage.

8. The method of claim 1, further comprising:
   determining whether the speed of the motor is substantially equal to a target speed of the motor.

9. The method of claim 8, further comprising:
   increasing an amplitude of the drive voltage when the speed of the motor is lower than the target speed of the motor; and
   decreasing the amplitude of the drive voltage when the speed of the motor is higher than the target speed of the motor.

10. An apparatus comprising:
    a motor; and
    a driver circuit to measure a speed of the motor, determine a phase angle of a motor voltage relative to a motor current based on the measured speed of the motor, adjust a profile of the motor voltage by the determined phase angle, and generate a profile of a drive voltage based on the adjusted profile of the motor voltage and a back-EMF profile,
    wherein a profile of the motor current is substantially aligned with the back-EMF profile of the motor.

11. The apparatus of claim 10, wherein the driver circuit includes a controller to determine the phase angle of the motor voltage, the phase angle satisfying the following equation:

$$\alpha = \tan^{-1}\left(\frac{wL}{R}\right),$$

where α is the phase angle, w is an angular velocity of a rotor of the motor, L is an inductance value of an inductor component of the motor, and R is a resistance value of a resistor component of the motor.

12. The apparatus of claim 10, wherein the driver circuit includes:
    one or more Hall effect sensors to detect a position of a rotor of the motor; and
    a controller to measure the speed of the motor based on the detected position of the rotor.

13. The apparatus of claim 10, wherein the driver circuit includes:
    a back-EMF detector to detect one or more back-EMF profiles of the motor; and
    a controller to measure the speed of the motor based on the detected back-EMF profiles.

14. The apparatus of claim 10, wherein the driver circuit includes:
    a storage device to store a reference back-EMF profile.

15. The apparatus of claim 14, wherein the driver circuit further includes:
    a controller to scale the reference back-EMF profile based on the speed of the motor to generate the back-EMF profile.

16. The apparatus of claim 10, wherein the driver circuit includes a controller, the controller to sum the back-EMF profile and the adjusted profile of the motor voltage to generate the profile of the drive voltage.

17. The apparatus of claim 10, wherein the driver circuit includes a controller, the controller to determine whether the speed of the motor is substantially equal to a target speed of the motor.

18. The method of claim 17, wherein the controller increases an amplitude of the drive voltage when the speed of the motor is lower than the target speed of the motor, and wherein the controller decreases the amplitude of the drive voltage when the speed of the motor is higher than the target speed of the motor.

* * * * *